United States Patent Office 2,959,330
Patented Nov. 8, 1960

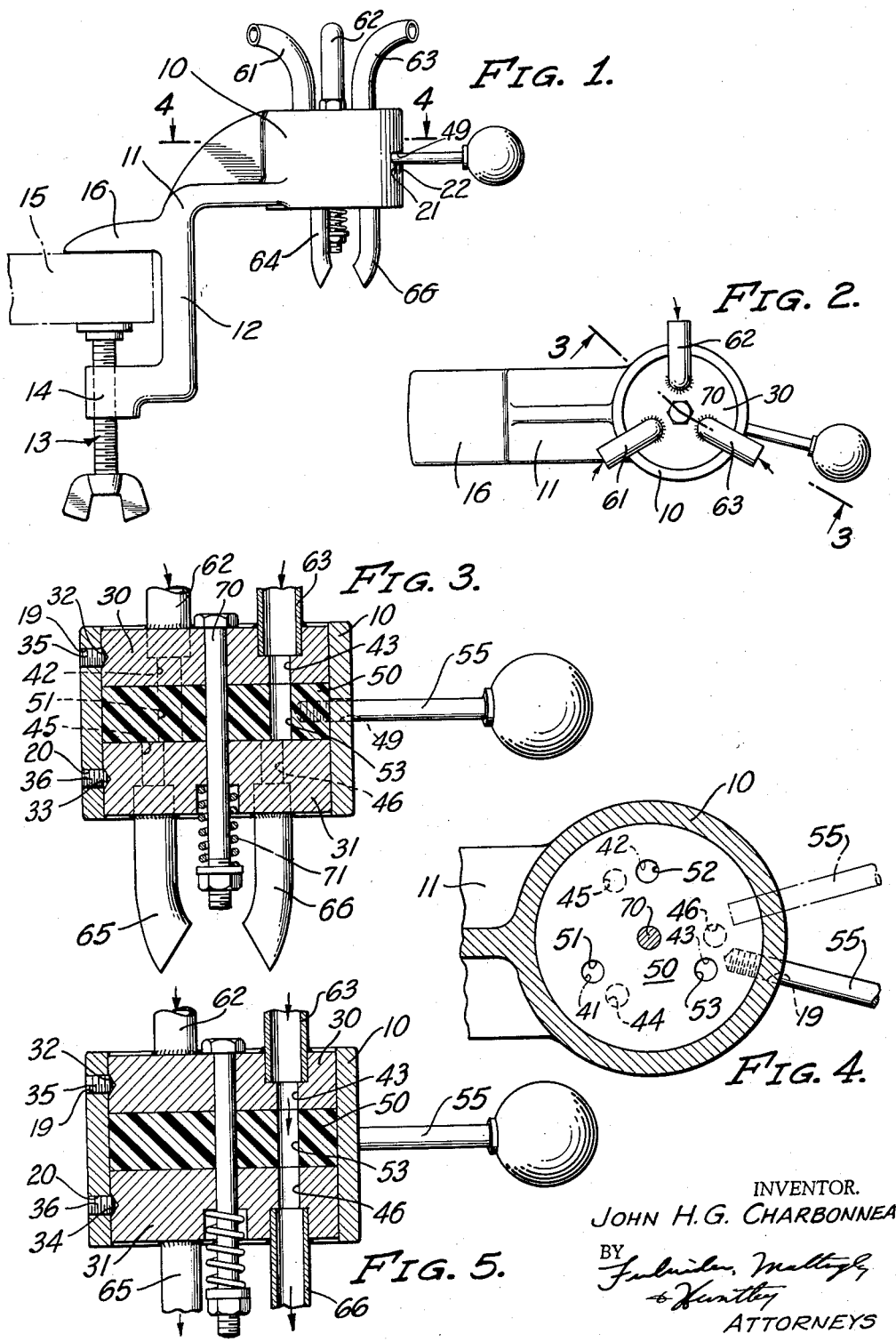

2,959,330

MULTIPLE SYRUP DISPENSER

John H. G. Charbonneau, P.O. Box 53, Calimesa, Calif.

Filed Mar. 5, 1959, Ser. No. 797,501

2 Claims. (Cl. 222—181)

This invention relates generally to confectioners equipment and more particularly to a measuring and dispensing device for fruit and other syrups as particularly used in connection with the confection known as "Snow Cones."

At amusement parks, fairs, and the like, a large business is transacted in the dispensing of various types of confections to the visitors to such places. One of the more popular confections is an item called "Snow Cone." This consists of a holding medium, usually in a conical shape of paper or the like. This is filled with finely chopped ice and a flavored syrup is poured upon it. Various syrups are used to achieve different fruit and other flavors.

I have observed that children and other purchasers of Snow Cones are particularly pleased if they are made with a mixture of flavors—that is with one portion of it being one flavor and another portion being another flavor, such as segmented Snow Cone with one section of strawberry, one section lemon, and one section orange, and similiar such combinations.

The production of such a combination is difficult, time consuming, and costly, since the careful dispensing of one and then another liquid in this manner in measured quantities presents quite obvious problems of operator control and calculation.

A further complication exists in that any equipment to produce these items must of necessity be simple and portable, since the greatest business in this type of confection is involved with activities moving from one location to another, such as from a fair to another fair and the like.

I have devised a simple dispensing mechanism which can be connected to various sources of flavoring syrups and which by a shifting center block can receive simultaneously three different fluids of equal or varied viscosity and accurately and automatically measure exact quantities and then dispense the same. One of the problems encountered is that all syrups are not necessarily of equal viscosity. Therefore, a mere time device by which different syrups flow like periods of time is not feasible. I have overcome this problem by the simple expedient of having exact quantities, regardless of time, drop into separate measured containers which are a part of the dispensing device, and then uniformly dispensed upon the snow cone.

Thus, it is a major object of my invention to provide a portable device for dispensing measured quantities of different liquids at the same time; it is still a further object of my invention to provide such a device as heretofore described which will automatically measure like quantities of liquids of different viscosities; it is still a further object of my invention to provide a device as described which is simple and easily portable; it is still a further object of my invention to provide a device as described to uniformly dispense liquids simultaneously.

The foregoing and other objects and advantages of my invention will be readily understood by those skilled in the art from the following description when read in conjunction with the attached drawings in which:

Figure 1 is a side elevation of a preferred embodiment of my device;

Figure 2 is a plan view of the same embodiment of my invention;

Figure 3 is a sectionalized view through 3—3 of Figure 2 but in which the center bolt is not sectionalized;

Figure 4 is a section of the dispensing portion of the same embodiment through the plane 4—4 of Figure 1; and Figure 5 is the same view as Figure 3 except that the lower dispensing block has been so aligned that a continuous flow of syrup through the dispenser may be achieved.

The device is seen to consist of a housing 10 formed integrally with a bracket 11 and a holding-clamp 12 capable of being fastened to a shelf or the like by screw 13 which screws through a threaded hole 14 (threads in hole not shown); the shelf or the like 15 is shown in phantom. A lip 16 on the bracket 11 serves as the clamping side opposed to the bolt 13.

Within the housing 10, which is circular in cross-section and cylindrical in shape, there are located two disks 30 and 31 formed from stainless steel or other suitable material which can come in contact with foods.

Each of the disks 30 and 31 is provided with two indents at spaced apart points laterally in the same plane upon the outer edge of said disk. In the drawing Figure 3 only one of each of the indents are shown, 32 and 33 respectively. In Figure 5 indent 32 is still shown on disk 30 but indent 34 rather than 33 is in position on disk 31. The different indents are to provide different alignment of the holes in the disks as will be described below.

The indents are so shaped that they are of greater height than width, in order that set screws 35 and 36 may provide a hold against lateral movement but will allow transverse movement in limited amount. Set screws 35 and 36 are of common construction, screwed into threaded holes 19 and 20 respectively in the housing 10.

A third disk 50 of fiber or other suitable non-toxic, non-corrosive material is sandwiched between disks 30 and 31 within the housing 10.

Disk 30 is provided with holes 41, 42 and 43 extending through its thickness and disk 31 is provided with holes 44, 45, and 46 extending through its thickness. Each of the holes in each of the disks 30, 31 comprises a relatively small diameter hole through a portion of the disk with an enlargement at each of the outer sides of said disk to accommodate syrup receiving and dispensing tubes. The syrup receiving tubes are of stainless steel or the like and are shown on the drawings as 61, 62, and 63 respectively. The syrup dispensing tubes are shown as 64, 65 and 66 and are comprised of stainless steel or other suitable tubing fastened into a shoulder in the holes 44, 45 and 46 as indicated.

The center disk 50 is also provided with three holes 51, 52 and 53 respectively. Each of these holes is of a diameter equal to the diameter of holes 41 through 46 and each of the holes in each of the disks is spaced at an equal distance from the outer edge of the disk and at 120 degree intervals.

Each of the disks 30, 31 and 50 has a center hole, shown but unnumbered, through which a bolt 70 passes. A spring 71 is held between the nut of the bolt and the lower disk 31 so as to provide a tension between the disks holding them together. The disks thus press against one another to form a tight seal between them.

The housing 10 is provided with a slot 49 through which a handle 55 is passed. Handle 55 has a threaded end which screws into a threaded hole in disk 50; the threaded hole in disk 50 and threaded end of handle 55 are shown in phantom lines on Figure 3 and Figure 4 but are unnumbered. Handle 55 allows the disk 50 to be shifted with relation to the holes in the disks 30 and 31.

Suitable marks 21 and 22, or other identifying media are indicated upon the housing in the area of the slot 49 to indicate the position of alignment of the holes in the various disks as heretofore described.

In Figure 3 it will be seen that the dispensing tubes 64, 65 and 66 are out of alignment with receiving tubes 61, 62 and 63. When the holes in the intermediate disk 50 are aligned with the syrup receiving tubes 61, 62 and 63 they become filled with syrup but the syrup cannot run out of them since they terminate against a solid portion of disks 31.

When the disk 50 is moved, the holes 51, 52 and 53 go out of alignment with the receiving tubes and into alignment with the dispensing tubes 64, 65 and 66, thus a measured quantity, the exact quantity which fills the holes within the disk 50 is dispensed through the dispensing tubes. It is to be observed that although no drawing has been provided to show the holes 51, 52 and 53 of a size other than the same size as holes 41 through 46, that the holes 51, 52 and 53 might be many times larger in diameter and could be oblong or other shape if desired. By having holes with larger diameters than that of the receiving and dispensing holes, varying quantities of fluid could be stored in each of said holes so that when the disk 50 is used to measure a fixed quantity that various quantities could be measured in each of the holes. It would also be possible to vary the size of the holes so that one of the holes 51, 52 or 53 might be larger than the others and thus predetermined ratios of fluid could be dispensed simultaneously in this manner. Thus by merely aligning the holes 51, 52 and 53 with the receiving holes 41, 42 and 43 large quantities could be stored within the holes 51, 52 and 53 or varied quantities could be stored within any of said holes. When the disk 50 was then moved out of alignment with the receiving passages and into alignment with the dispensing passages, the total amount of fluid stored in the holes 51, 52 and 53 would be dispensed simultaneously.

Figure 5 shows an alternate arrangement in which the position of lower disk 31 has been shifted by setting set screw 36 in detent 34 rather than 33. When in this position the lower disk 31 is shifted so that its holes become in identical alignment with the holes in disk 30. In this position, when disk 50 is so aligned that its holes become in alignment with the others, there can be a straight-through continuous flow of syrup which, of course, can be cut off by shifting disk 50 out of alignment with both sets of holes in the upper and lower disks.

While the embodiment of my invention shown and described is fully capable of achieving the advantages and objects desired, it will be obvious to those skilled in the art that many modifications and changes may be made without departing from the inventive concept disclosed. It is not my intention to be limited by the specific embodiment disclosed but only as required by the appended claims.

I claim:

1. A device of the character described comprising: a cylindrical housing having a slot through its thickness for a portion of its circumference approximately the center thereof; a bracket suitable to attach to a shelf fastened to said housing; a first disk having a circumference equal to the interior circumference of said housing held within said housing by a set screw, said first disk having three fluid passages through its thickness at equally spaced intervals from one another and at an equal distance from the center of said disk, said disk being provided with a center hole; a second disk having a handle attached to its circumference and extending through said slot in said housing, said second disk having fluid passages in alignment with fluid passages in said first disk and having a center hole in alignment with the center hole of said first disk, said second disk being located immediately adjacent said first disk within said housing; a third disk held within said housing and immediately adjacent the other side of said second disk; said third disk being provided with fluid passages in alignment with the fluid passages in said second disk, said third disk being circumferentially movable so that said holes may be adjusted out of alignment with said holes in said first and said second disks, said third disk being provided with a center hole in alignment with the center holes in said first and second disks; set screws in said housing holding said first and third disks therein; a bolt through said center holes in all three of said disks the head of said bolt being in contact with the face of said first disk opposed to the face which is in contact with said second disk; a spring placed over the threaded end of said bolt in contact with the face of said third disk opposed to the face in contact with said second disk; a nut placed upon the threads of said bolt so as to compress said spring against said third disk; fluid supply means fastened to each of said fluid passages in said first disk; and fluid dispensing tubes fastened to each of said fluid passages in said third disk.

2. A device of the character described comprising: a cylindrical housing having a slot through its thickness for a portion of its circumference approximately the center thereof; a bracket suitable to attach to a shelf fastened to said housing; a first disk having a circumference equal to the interior circumference of said housing held within said housing by a set screw, said first disk having three fluid passages through its thickness at equally spaced intervals from one another and at an equal distance from the center of said disk, said disk being provided with a center hole; a second disk having a handle attached to its circumference and extending through said slot in said housing, said second disk having fluid reservoirs in alignment with fluid passages in said first disk and having a center hole in alignment with the center hole of said first disk, said second disk being located immediately adjacent said first disk within said housing; a third disk held within said housing and immediately adjacent the other side of said second disk; said third disk being provided with fluid passages in alignment with the fluid reservoirs in said second disk, said third disk being circumferentially movable so that said holes may be adjusted out of alignment with said holes in said first and said second disks, said third disk being provided with a center hole in alignment with the center holes in said first and second disks; set screws in said housing holding said first and third disks therein; a bolt through said center holes in all three of said disks the head of said bolt being in contact with the face of said first disk opposed to the face which is in contact with said second disk; a spring placed over the threaded end of said bolt in contact with the face of said third disk opposed to the face in contact with said second disk; a nut placed upon the threads of said bolt so as to compress said spring against said third disk; fluid supply means fastened to each of said fluid passages in said first disk; and fluid dispensing tubes fastened to each of said fluid passages in said third disk.

References Cited in the file of this patent

UNITED STATES PATENTS

| | | |
|---|---|---|
| 1,465,680 | Pappas et al. | Aug. 21, 1923 |
| 1,688,067 | Barry | Oct. 16, 1928 |
| 1,758,552 | Allen et al. | May 13, 1935 |